(12) United States Patent
Parker

(10) Patent No.: US 9,279,732 B2
(45) Date of Patent: Mar. 8, 2016

(54) INTERNAL TEMPERATURE INDICATOR

(76) Inventor: Robert Parker, Bend, OR (US)

( * ) Notice: Subject to any disclaimer, the term of this patent is extended or adjusted under 35 U.S.C. 154(b) by 168 days.

(21) Appl. No.: 13/484,907

(22) Filed: May 31, 2012

(65) Prior Publication Data

US 2012/0307865 A1 Dec. 6, 2012

Related U.S. Application Data

(60) Provisional application No. 61/492,060, filed on Jun. 1, 2011.

(51) Int. Cl.
G01K 3/00 (2006.01)
G01K 11/06 (2006.01)

(52) U.S. Cl.
CPC ........................................ G01K 11/06 (2013.01)

(58) Field of Classification Search
CPC .................................. G01K 13/00; G01K 3/00
USPC ........... 374/156, 102–105, 160, 205, 16, 100; 116/216, 200, 228
See application file for complete search history.

(56) References Cited

U.S. PATENT DOCUMENTS

| | | | | |
|---|---|---|---|---|
| 3,054,293 A * | 9/1962 | Friedrichs | ..................... | 374/104 |
| 4,064,828 A * | 12/1977 | Clark | ........................... | 116/215 |
| 4,426,885 A * | 1/1984 | Visco | ........................... | 73/865.8 |
| 4,447,164 A * | 5/1984 | Berndt | ......................... | 374/162 |
| 5,144,111 A * | 9/1992 | Von Gaisberg et al. | ...... | 219/265 |
| 5,447,248 A * | 9/1995 | Rodriguez et al. | ............ | 215/366 |
| 5,799,606 A * | 9/1998 | Volk | ....................... | G01K 11/06 116/217 |
| 6,422,746 B1 * | 7/2002 | Weiss et al. | .................... | 374/156 |
| 7,011,445 B1 * | 3/2006 | Hamilton et al. | ............. | 374/201 |
| 7,213,967 B2 * | 5/2007 | Simunovic | ............. | G01K 1/022 374/102 |
| 7,387,438 B2 * | 6/2008 | Parker | ......................... | 374/160 |
| 8,172,458 B2 * | 5/2012 | Petrakis | ....................... | 374/101 |
| 2005/0220169 A1 * | 10/2005 | McGowan-Scanlon | ...... | 374/156 |

FOREIGN PATENT DOCUMENTS

DE 4322893 A1 * 11/1993

* cited by examiner

Primary Examiner — Gail Kaplan Verbitsky
(74) Attorney, Agent, or Firm — Laurence P. Colton; Smith Risley Tempel Blaha LLC

(57) ABSTRACT

A temperature indicator having a tubular structure; a float or floating particles releasably held in place in the tubular structure by a temperature dependent material that is activated at or about a critical temperature, the float or floating particles having a first density; and a fluid within the tubular structure, the fluid having a second density that is less than the first density. When the temperature indicator is heated to the critical temperature, the temperature dependent material activates and releases the float or the floating particles, which rise in the fluid so as to be visible as in indicator that the critical temperature has been reached.

11 Claims, 8 Drawing Sheets

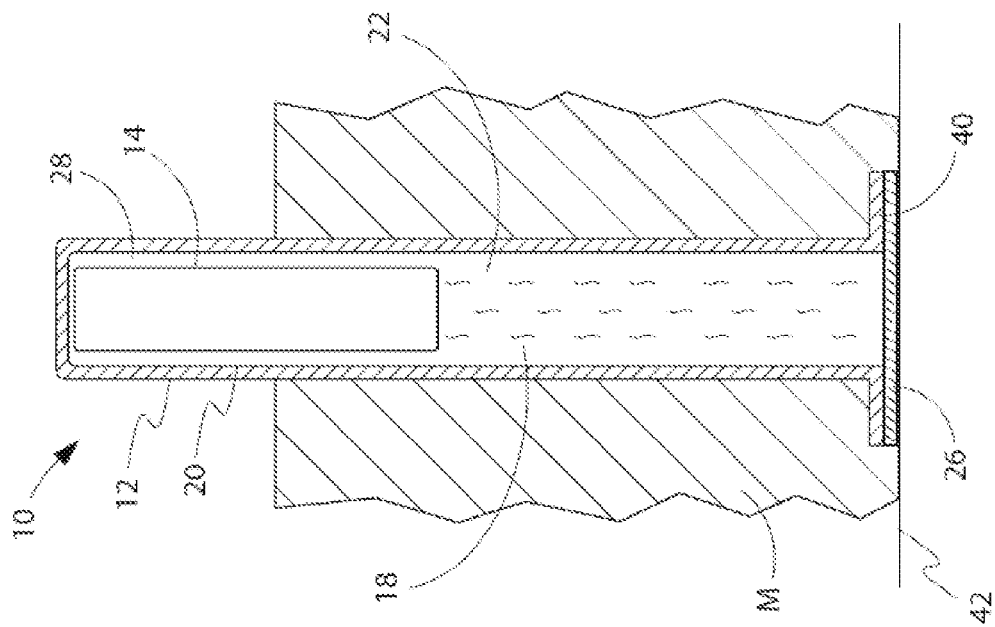
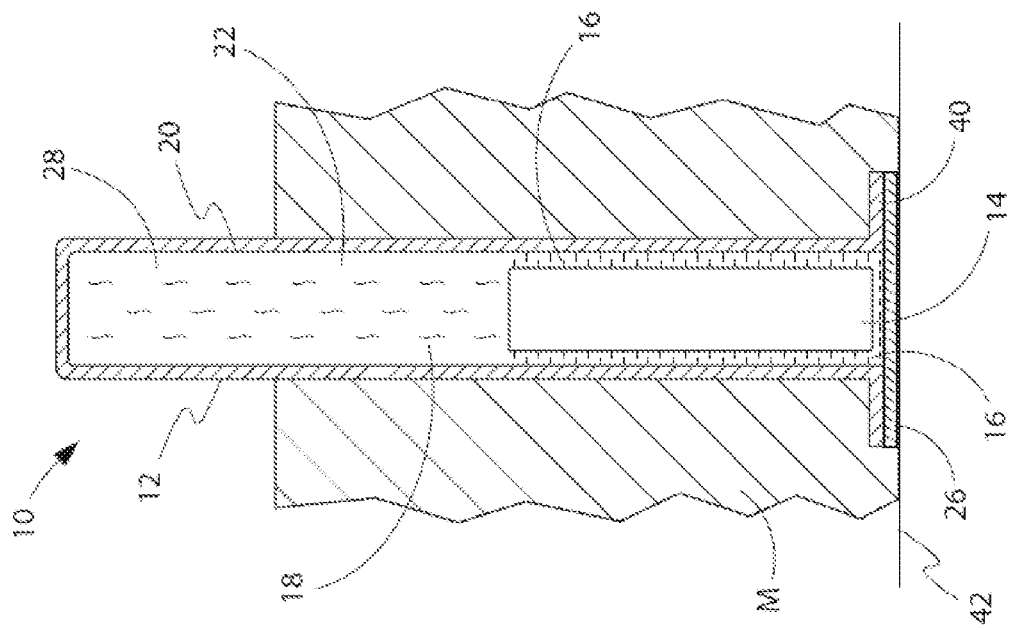

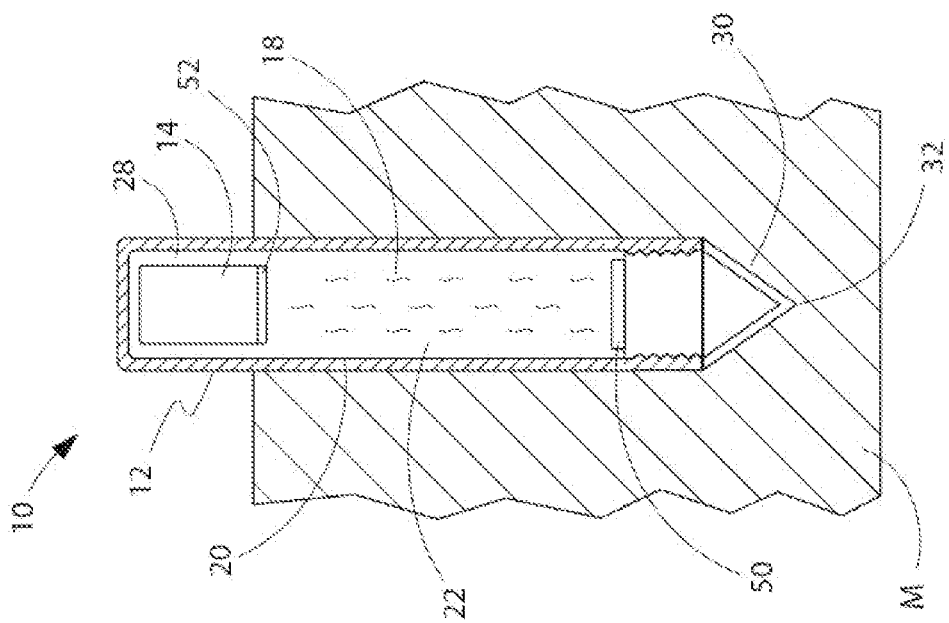
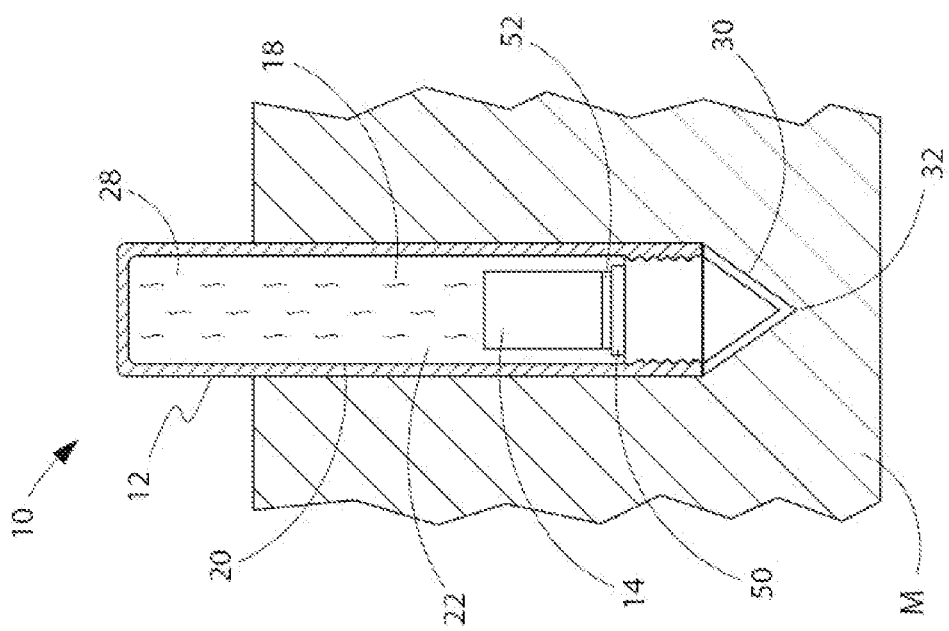

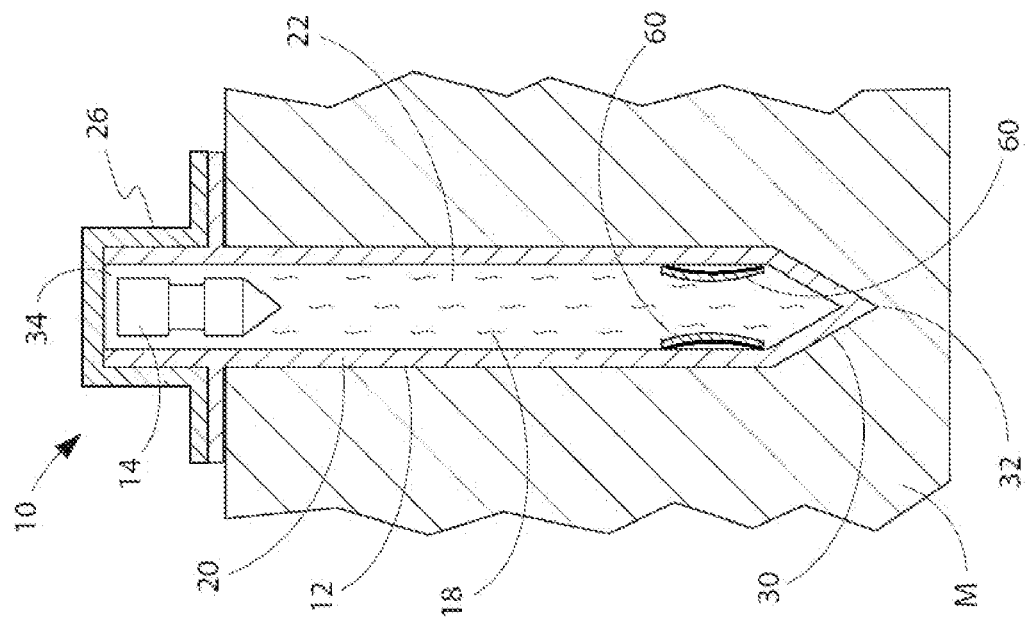
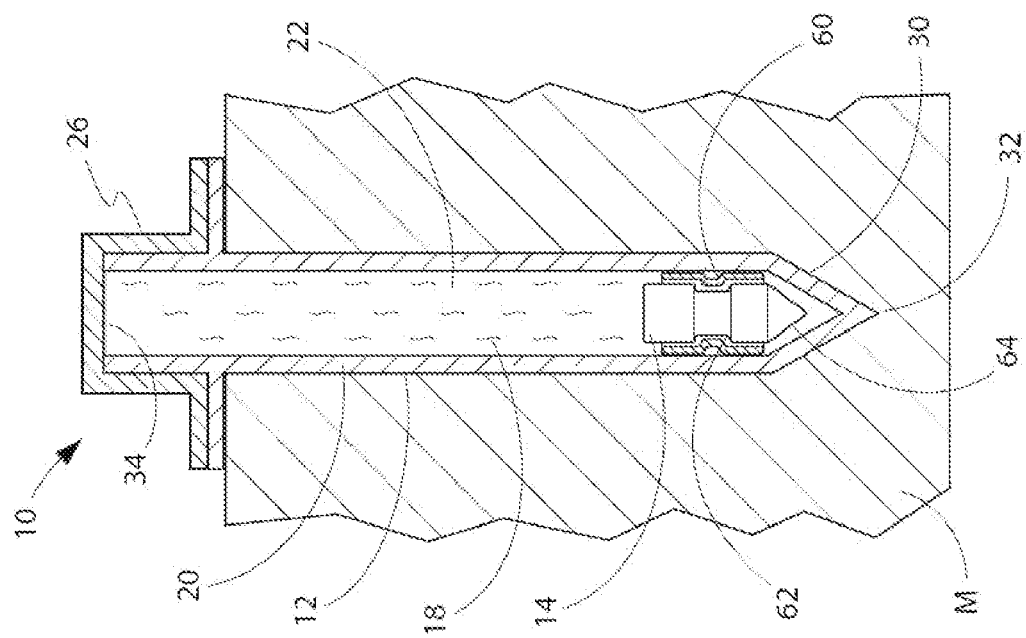

INTERNAL TEMPERATURE INDICATOR

STATEMENT OF RELATED APPLICATIONS

This patent application claims the benefit of and priority on U.S. Provisional Patent Application No. 61/492,060 having a filing date of 1 Jun. 2011.

BACKGROUND OF THE INVENTION

1. Technical Field

This invention is generally related to the technical field of devices for measuring the internal temperature of masses, and more specifically related to the technical field of devices for showing if the internal temperature of a mass has reached a certain value.

2. Prior Art

There are many situations or applications where it is desirable to know or show when the internal temperature of a mass has reached some critical value and visually show this change externally. For example when cooking foods such as turkey, chicken, and roasts it would be useful to show when the internal temperature or doneness has been achieved. This is also true when heating foods in a microwave oven as the heating can be non-uniform. An indicator showing that the entire food item, or at least some internal portion of the food item, has reached some critical temperature throughout the thickness of the food item would be advantageous. Similarly, when shipping perishable foods, vaccines or medications, it is important to know if the internal contents have exceeded some peak temperature.

A number of devices have been used to measure internal temperatures. Volk Enterprises, Inc. uses a spring that is compressed and held in the compressed state by a sharp melting polymer or other material that will release the spring and allow an indicator to become visible when heated to the melt temperature. The spring may not be able to be used in microwave heating applications as the induced eddy currents from the microwave radiation may heat the metal spring and may cause a premature release. Moreover, as the spring subjects the restraining material to some stress, the restraining material may become subject to viscoelasticity near the melt temperature so that the release of the spring may become heating rate dependent. Additionally, it is not a closed system and is subject to contamination.

U.S. Pat. No. 7,387,438 describes a peak temperature indicator that uses a sharp melting column of a material, such as a polymer, wax, metal, or other material, that restrains a float. When the entire column becomes a liquid, the float will rise to the top of a protruding transparent enclosed system. While this concept is simple and easy to use, it does have some deficiencies. The polymers tend to be relatively insensitive to microwave heating; hence the melting of the polymer is dependent on heat transfer from the surrounding food. In addition the polymers expand approximately 8% when heated from its solid crystalline state into its liquid state.

A simpler and less expensive device that avoids these problems is disclosed in the present specification.

BRIEF SUMMARY OF THE INVENTION

Briefly, the present invention is an indicator that can be used to visually indicate when the internal temperature of a mass has reached a certain predetermined critical temperature. In one embodiment, the invention comprises a transparent, semi-transparent, or translucent sealed tube containing a float. The float is held in place in one part of the tube by a holding material, such as a sharp melting polymer that melts at a certain predetermined temperature. When the device has reached the certain predetermined temperature, the holding material melts, allowing the float to rise in the tube, giving a visual indication to the user that the certain predetermined temperature has been reached internally in the mass.

Preferably, the tubular structure is axially hollow and is constructed from high melting temperature plastics, preferably having a melting point of at least 350°-400° F. such that the invention can be used in food preparation. The tubular structure may be injection molded, thermoformed, or manufactured using other forming techniques. The tubular structure preferably is made from a material that is clear enough to see the float, but can be translucent to hide or lessen the visibility of the fluid contained in the tubular structure.

The tubular structure is filled with a fluid, preferably having a boiling point of at least 350°-400° F. such that the invention can be used in food preparation. Food grade oils and other food grade liquids are a preferred fluid. Other fluids suitable are non-toxic fluids such that the invention is safe for use by humans and in connection with foods and materials consumed or used by humans.

A float constructed of balsa wood, high temperature closed cell foam, or some other material relatively less dense than the fluid contained in the tubular structure also is contained within the tubular structure. The float preferably has an outer diameter or measurements smaller than the inner diameter or measurements of the tubular structure such that the float can freely rise within the tubular structure. In various embodiments, the float can be a sphere, a rod, a plurality of particles, or a combination thereof. If the float is a rod, it is preferable that the rod have a length longer than its diameter such that the rod will not easily rotate about an axis perpendicular to its linear axis and become stuck in the tubular structure.

The float is initially held onto the interior wall and/or at one end of the tubular structure by the holding material, which can be a sharp melting polymer. In one embodiment, the holding material can be coated on the float and bond the float to the inside of the tubular structure with a thin coating. In another embodiment, the holding material can contain low density material such as dyed wood chips or dyed hollow glass bead(s) instead of or in addition to a float. Carbon or other low density materials also may be used as an addition to the holding material or as or in addition to the holding material.

The tubular structure can be sealed in many ways so that the fluid, float, and holding material, and any added materials, cannot escape. In various embodiments, the tubular structure can be sealed using end caps sonically welded or adhered using an adhesive to the end of the tubular structure, or the ends of the tubular structure can be heat sealed or mechanically compressed.

A complete understanding of the present invention may be obtained by reference to the accompanying drawings, when considered in conjunction with the subsequent, detailed description of preferred embodiments in which like elements and components bear the same designations and numbering throughout the figures.

BRIEF DESCRIPTION OF THE DRAWINGS

FIG. 4A shows a cross section of a third embodiment of the device of the present invention similar to the embodiment of FIG. 4 with an elongated float and before heat has been applied to the food.

FIG. 5A shows a cross section of the device of FIG. 4A after heat has been applied to the food and the food has reached a critical temperature.

FIG. 6 shows a cross section of a fourth embodiment of the device of the present invention using a Curie temperature magnet and before heat has been applied to the mass.

FIG. 7 shows a cross section of the device of FIG. 6 after heat has been applied to the mass and the mass has reached a critical temperature.

FIG. 8 shows a cross section of a fifth embodiment of the present invention using bimetallic or nitinol memory material and before heat has been applied to the mass.

FIG. 9 shows a cross section of the device of FIG. 8 after heat has been applied to the mass and the mass has reached a critical temperature.

DETAILED DESCRIPTION OF PREFERRED EMBODIMENTS

Figure 1:
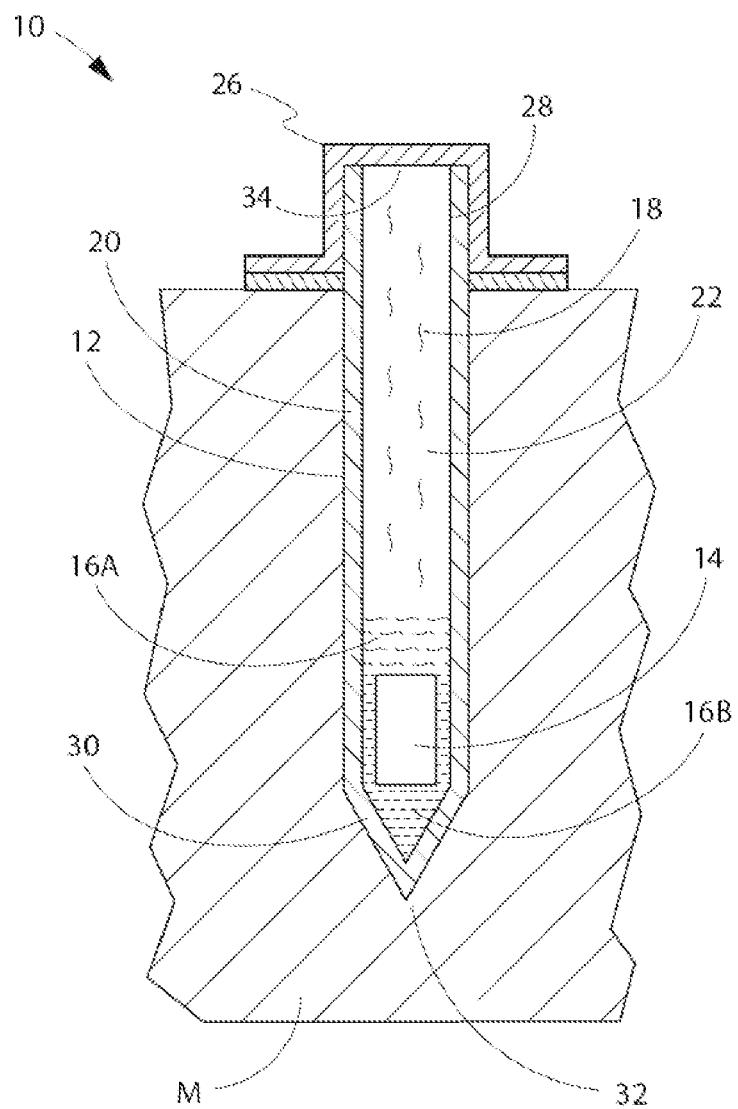
FIG. 1 shows a cross section of a first embodiment of the device of the present invention for insertion into mass and before heat has been applied to the mass.

Generally, the present invention is a temperature indicator comprising:
a) a hollow tubular structure having an outer wall and a hollow interior;
b) a float or floating particles releasably held in place in the hollow interior of the tubular structure by a temperature dependent material or device that is activated at or about a critical temperature, the float or floating particles having a first density; and
c) a fluid within the hollow interior of the tubular structure, the fluid having a second density that is greater than the first density,
wherein when the temperature indicator is heated to the critical temperature, the temperature dependent material or device activates and releases the float or the floating particles, which rise in the fluid so as to be visible as an indicator that the critical temperature has been reached.

In one preferred embodiment of the invention, the temperature dependent material is a sharp melting point material that melts at or about the critical temperature, wherein when the temperature indicator is heated to a temperature at or about the critical temperature, the sharp melting point material melts and releases the float or the floating particles. Sharp melting point materials are known in the art.

In another preferred embodiment of the invention, the temperature indicator comprises two different sharp melting point materials having different critical temperatures.

In another preferred embodiment of the invention, the temperature dependent device is a Curie temperature magnet material that becomes non-magnetic at or about the critical temperature and releases the float or the floating particles. Curie temperature magnets are known in the art.

In another preferred embodiment of the invention, the temperature dependent device is a bimetal restraining a float until the critical temperature is reached, at which point the bimetal moves, releasing the float or the floating particles. Bi metals are known in the art.

In another preferred embodiment of the invention, the temperature dependent material is a shape memory material restraining a float until the critical temperature is reached, at which point the shape memory material changes shape, releasing the float or the floating particles. Shape memory materials are known in the art.

In preferred embodiments of the invention, the temperature indicator may be reset and reused when turned upside down or inverted after it has cooled.

In a preferred embodiment, the present invention is an indicator that can be used to visually indicate when the internal temperature of a mass has reached a certain predetermined critical temperature. The indicator device 10 comprises a transparent, semi-transparent, or translucent sealed tubular structure 12 containing a float 14 and a fluid 18. The float 14 is held in place in one part of the tubular structure 12 by a holding material 16, such as a sharp melting polymer that melts at a certain predetermined temperature. When the indicator device 10 has reached the certain predetermined temperature, the holding material 16 melts, allowing the float 14 to rise in the tubular structure 12, giving a visual indication to the user that the certain predetermined temperature has been reached internally in the mass M.

As can be seen in the figures, as the premise of the indicator device 10 is the rising of a float 14 within a fluid 18, and therefore relies on differential densities and gravity, the indicator device 10 must be used in a certain position so as to allow the float 14 to rise within the fluid 18. Thus, the figures show the preferred embodiments of the indicator devices 10 in a vertical position relative to or within the mass M whose temperature is to be determined, the positioning of the indicator device 10 may be somewhat off vertical, and up to about 90 degrees off vertical.

Preferably, the tubular structure 12 is axially hollow, having an outer wall 20 and an inner hollow plenum 22. The tubular structure 12 preferably is constructed from high melting temperature plastics or other materials, preferably having a melting point of at least 350°, preferably at least 350°-600° F., and more preferably least 350°-400° F., such that the indicator device 10 can be used in food preparation. If constructed from plastics, the tubular structure 12 may be injection molded, thermoformed, or manufactured using other forming techniques. The tubular structure 12 preferably is made from a material that is clear enough to see the float 14, but can be translucent to hide or lessen the visibility of the fluid 18 contained in the tubular structure 12.

The indicator device 10 preferably comprises a first end and a second end, wherein the first end is inserted into the mass M for which the temperature is to be indicated and the second end is visible outside of the mass M, and wherein the second end is constructed at least in part of a material through which the float 14 or floating particles 24 can be viewed.

Other materials of manufacture for the tubular structure 12 are suitable, such other materials preferably being non-toxic to, and safe for handling by, humans. Other such materials can include carbon fibers, glass fibers, ceramics, and glasses.

The tubular structure 12 is filled with a fluid 18, preferably having a boiling point of at least 200°, preferably at least 200°-400° F., and more preferably at least 200°-350° F., such that the indicator device 10 can be used in food preparation. Food grade oils and other food grade liquids are a preferred fluid 18. Canola oil, sunflower seed oil, safflower seed oil and other vegetable oils are suitable for use as the fluid 18. Other fluids suitable are non-toxic fluids such that the indicator device 10 is safe for use by humans and in connection with foods and materials consumed or used by humans. For example, animal oils or mineral oils can be used. Other liquids also can be used, so long as the float, particles, and added materials have a density sufficiently lower than the density of the fluid such that the float, particles, and added materials will rise when released by the holding material 16.

A float 14 also is contained within the tubular structure 12. The float 14 preferably is constructed of balsa wood, high temperature closed cell foam, or some other material relatively less dense than the fluid 18. The float 14 preferably has an outer diameter or measurements smaller than the inner diameter or measurements of the tubular structure 12 such that the float 14 can freely rise within the tubular structure 12, that is, freely float upwards through the fluid 18 after the float 14 has been released by the holding material 16. In various embodiments, the float 14 can be a sphere, a rod, a plurality of particles, or a combination thereof. If the float 14 is a rod, it is preferable that the rod have a length longer than its diameter such that the rod will not easily rotate about an axis perpendicular to its linear axis and become stuck in the tubular structure 12.

The float 14 is initially held onto the interior wall 20 and/or at one end of the tubular structure 12 by the holding material 16, which can be a sharp melting polymer. In one embodiment, the holding material 16 can be coated on the float 14 and bond the float 14 to the inside wall 20 of the tubular structure 12 with a thin coating of the holding material 16. In another embodiment, the holding material 16 can contain low density particles 24 such as dyed wood chips or dyed hollow grass bead instead of or in addition to a float 14. Carbon or other low density materials also may be used as an addition to the holding material or as or in addition to the holding material.

The tubular structure 12 can be sealed in many ways so that the fluid 18, float 14, holding material 16, and any added material cannot escape. In various embodiments, the tubular structure 12 can be sealed using end cap 26 sonically welded or adhered using an adhesive to the end of the tubular structure 12, or the ends of the tubular structure 12 can be heat sealed or mechanically compressed.

Figure 2:
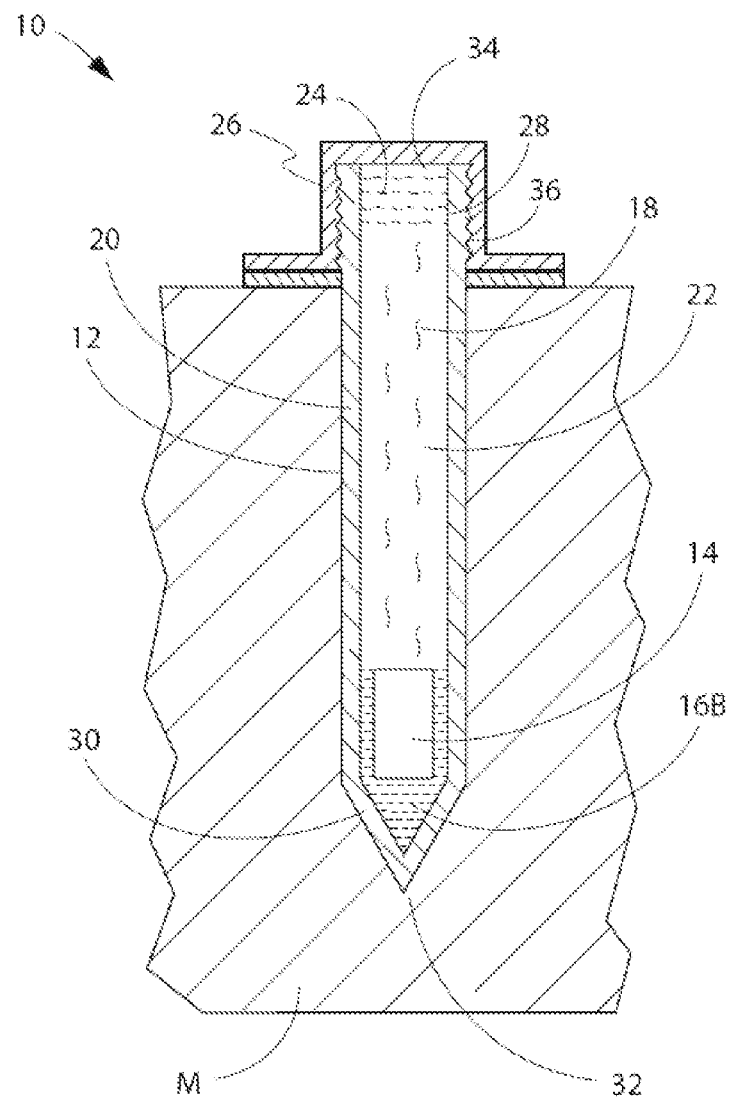
FIG. 2 shows a cross section of the device of FIG. 1 after some heat has been applied to the mass and the mass has reached some intermediate or first critical temperature.
Figure 3:
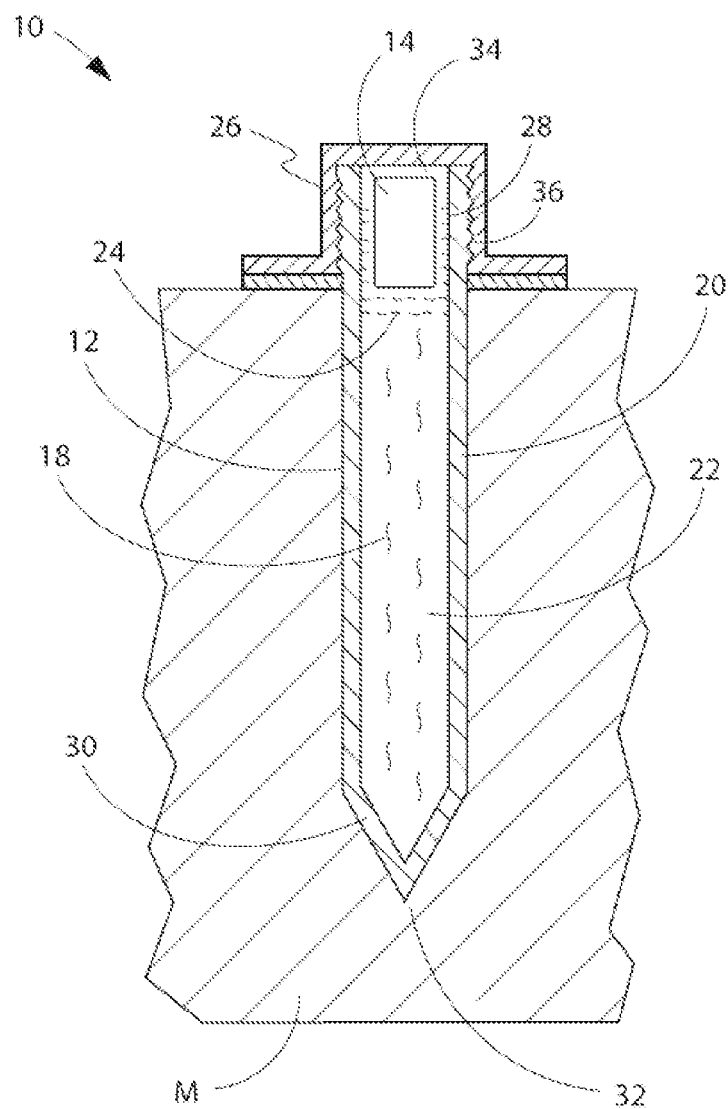
FIG. 3 shows a cross section of the device of FIG. 1 after more heat has been applied to the mass and the mass has reached a second critical temperature.

Referring now to FIGS. 1-3, a first embodiment of the indicator device 10 is shown. This embodiment comprises a dual indication system, with a first indicator being particles 24 and a second indicator being a float 14. More specifically, the particles 24 are contained within a first holding material 16A having a first critical melting temperature and the float 14 is attached to the wall 20 of the tubular structure 12 by a second holding material 16B having a second critical melting temperature. When the first critical temperature is reached, the first holding material 16A melts, allowing the particles 24 to float to the top of the indicator device 10. This gives a first visual indication that the first critical temperature has been reached. When the second critical temperature has been reached, the second holding material 16B melts, allowing the float 14 to float to the top of the indicator device 10. This gives a second visual indication that the second critical temperature has been reached. For example, the second critical temperature can be the temperature at which the mass M is done, for example the medium rare temperature for a roast beef, and the first critical temperature can be 10 degrees cooler so as to give the user an indication that the mass M is almost at the second critical temperature. In effect, the particles 24 indicate that the roast beef is almost done and the user may have 10 more minutes until the roast beef is done.

FIG. 1 illustrates a transparent or translucent unitary tubular structure 12 having cylindrical sidewall 20 tapering inward at the bottom 30 to a point 32 and having an open top end 34. Float 14, holding material 16, and fluid 18 can be inserted into hollow interior 22 of tubular structure 12 through top end 34, and then end cap 26 can be attached to top end to seal tubular structure 12. As shown in FIG. 1, end cap 26 is ultrasonically bound onto top end 34. Point 32 allows the indicator device 10 to be more easily inserted into the mass M.

FIG. 1 shows a cross section of a first embodiment of the indicator device 10 before heating or before having reached the critical temperature. As can be seen, both holding materials 16A, 16B and float 14 are located at the bottom of tubular structure 12 and both holding materials 16A, 16B are in solid form. Float 14 is attached to the interior of wall 20 preferably with a sharp melting polymer as the holding material 16. Examples of such materials include but are not limited to those produced by Landec Corporation or Bay Materials. More specifically, the float 14 can be coated by the holding material 16, in this case preferably second holding material 16B, at a temperature at or above the critical melting temperature of the second holding material 16B, inserted into the tubular structure 12 to the point on the inner wall 20 where it is desired to bond the float 14, and then cooled such that the second holding material 16B solidifies and bonds the float 14 to the inside of the tubular structure 12 with a thin coating. The tubular structure 12 then is filled with fluid 18 to the top and the end cap 26 seals the fluid 18 in place. The indicator device 10 then can be inserted into the mass M.

FIG. 2 shows when the heat diffusion through the mass M becomes hot enough to melt the holding material 16, and in this example, first holding material 16A, and allows the particles 24 to float to the protruding portion 28 to show a cooking warning that so many, that is a certain number of, minutes remain before the cooking is complete. More specifically, FIG. 2 shows a cross section of the indicator device 10 of FIG. 1 after some heating and the mass M has reached the first critical temperature. In FIG. 2, the first holding material 16 has melted allowing the particles 24 to float and rise in the tubular structure 12. As can be seen, a protruding portion 28 of the tubular structure 12 remains outside of the mass M such that the protruding portion 28 is visible to the user. The particles 24 preferably are colored or are otherwise made visible or more visible to the user such that when the particles 24 rise into the protruding portion 28 the particles cause a color change as an indication to the user. FIG. 2 illustrates the use of threads 36 to secure the end cap 26 onto the top end 34 of the tubular structure 12.

FIG. 3 shows a cross section of the device of FIG. 1 after the second critical temperature has been achieved releasing the float 14, which rises into the protruding portion 28 and displaces or at least partially displaces the particles 24 to give an indication that the second critical temperature has been reached.

The indicator device 10 shown in FIGS. 1-3, and preferably all of the embodiments of the indicator device 10, is constructed of a high temperature transparent or translucent material because the oven temperature may exceed 350° F. The end cap 26 may be made of polycarbonate or polysulfone. The tubular structure 12 may be made of a lower temperature material such as polyethylene. The higher temperature end cap 26 may not see very high oven temperatures because the oil filled indicator device 10 should provide free convection from the cool melt to maintain a lower temperature.

Again, a thin layer of sharp melting holding material 16 acts as a give to hold the float 14 in place. This allows for easy cold assembly as only the two zones with the holding materials 16A, 16B need to be heated. The tubular structure 12 can be filled with canola oil or any other food grade oil as the fluid 18. This prevents large volume changes and prevents evaporation or boiling as the boiling point of the oil is very high. This also allows the indicator device 10 to be filled to the top end 34 so the float 14 will rise to the very top.

The diameter of the float 14 preferably is smaller, for example 20-30% smaller, than the inside diameter of the tubular structure so little or no resistance will slow the ascendance of the float 14. The length of the float 14 should be greater, for example 30-50% greater, than the inner diameter of the tubular structure 12. Although the figures show a tubular construction, it is clear that hollow rectangular and other shapes, including other cross-sectional shapes, may be used.

The embodiment shown in FIGS. 1-3 will allow a two stage indicator so that the consumer will know approximately (for example 10-20 minutes) before a turkey is done when the particles 24 rise to the protruding portion 28 and are visible. The particles 24 may be red in color and therefore cause a red color at the top, for example. When the float 14, for example a green float 14, is released, the float 14 will rise and displace or at least partially displace the red floating particles 24 and will be visible. Hence the user has very clear indications that certain temperatures have been reached within the mass M. The float 14 also may have lettering on it, such as D for done, as an additional or alternate indicator.

Figure 4:
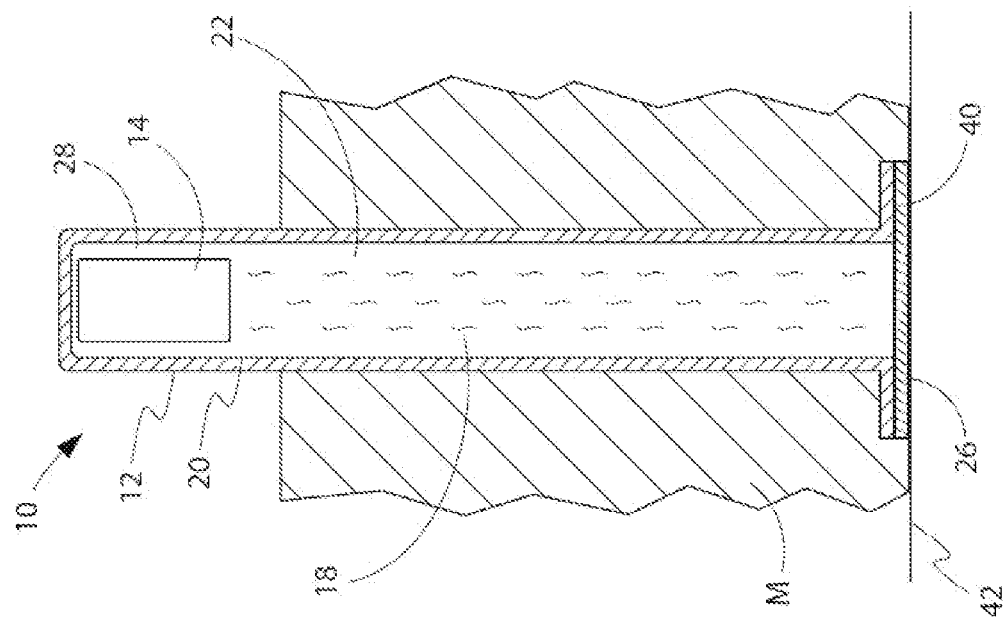
FIG. 4 shows a cross section of a second embodiment of the device of the present invention for use in food packaging and before heat has been applied to the food.
Figure 5:
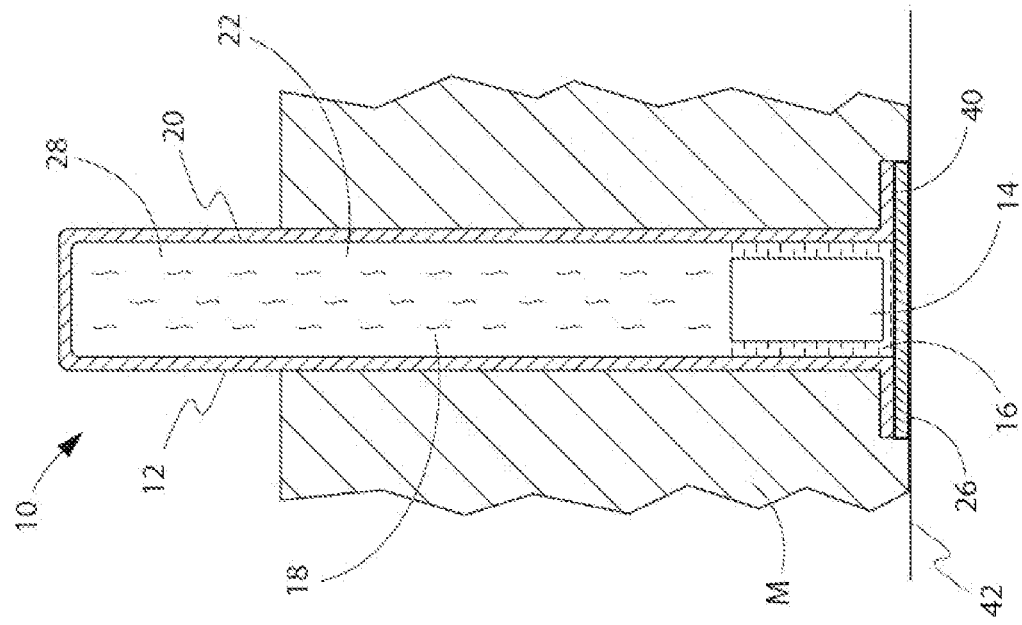
FIG. 5 shows a cross section of the device of FIG. 4 after heat has been applied to the food and the food has reached a critical temperature.

Referring now to FIGS. 4 and 5, a second embodiment of the indicator device 10 is shown, this embodiment having only a single holding material 16 and therefore triggering only at a single critical temperature. FIGS. 4 and 5 show a transparent tubular structure 12 with a flat bottom 40 that may be heat sealed. The flat bottom 40 facilitates bonding to a microwaveable frozen food heat tray 42. For example, the indicator device 10 can be attached to the food packaging by the food producing company at the time of, or approximately at the time of, the food being packaged. This embodiment of the indicator device 10 can be injection molded with a very thin 0.005-0.030 inch wall. In this embodiment, the tubular structure is inverted relative to the embodiment of FIGS. 1-3, as the top is closed and the bottom is open, with the end cap 26 being attached to the bottom.

FIG. 4 shows a cross section of this second embodiment having float 14 in a closed transparent tubular structure 12 before heating or before having reached the critical temperature. As can be seen, holding material 16 and float 14 are located at the bottom of tubular structure 12 and holding material 16 is in solid form. In this embodiment, the tubular structure 12 is filled with fluid 18 prior to the insertion of the float 14. Float 14 is attached to the interior of wall 20 preferably with a sharp melting polymer as the holding material 16. More specifically, the float 14 can be coated by the holding material 16 at a temperature at or above the critical melting temperature of the holding material 16, inserted into the tubular structure 12 to the point on the inner wall 20 where it is desired to bond the float 14, and then cooled such that the holding material 16 solidifies and bonds the float 14 to the inside of the tubular structure 12 with a thin coating. The end cap 26 then is attached to seal the tubular structure 12. The indicator device 10 then can be inserted through the mass M.

FIG. 5 shows a cross section of the device of FIG. 4 after the critical temperature has been achieved releasing the float 14, which rises into the protruding portion 28. More specifically, when the holding material 14 critical temperature has been achieved such that the holding material 16 melts, the float 14 will be released and will move up through the fluid 18 to the transparent protruding portion 28 to show that the food is done.

The float 14 is bonded to the wall with the holding material 16. Generally, only a very thin layer of the holding material 16 is required, with the thickness being in the range of about 0.008-0.010 inches. This reduces the cost of the holding material 16 but more importantly decreases the response time of the holding material 16 when it is heated by the microwave or other energy.

Often, the fluid 18, such as canola oil or other vegetable oils, also is heated by the microwave or other energy. The contact area between the float 14 and the inner wall 20 may be quite long so that any cold spot through the thickness would limit the float 14 response. The thin wall 20 and the thin layer of the holding material 16 is important for microwave heating because the heating time is in minutes as opposed to hours for oven heating.

Referring now to FIGS. 4A and 5A, a third embodiment of the indicator device 10 is shown. FIG. 4A shows a cross section of a third embodiment of the device of the present invention similar to the embodiment of FIG. 4 but with an elongated float 14 in a closed transparent tubular structure 12 before heating or before the critical temperature has been reached. FIG. 5A shows a cross section of the device of FIG. 4A after the critical temperature has been reached and the float 14 has floated to the top of the transparent tubular structure 12 into the protruding portion 28. A longer float 14 allows for more holding material 16 to be used and therefore a stronger bond between the float 14 and the wall 20, if desired. Also, a longer float 14 helps prevent the float 14 from becoming stuck in the tubular structure 12 when floating upwards.

Referring now to FIGS. 6 and 7, a fourth embodiment of the indicator device 10 is shown. FIG. 6 shows a cross section of this fourth embodiment with a transparent tubular structure where the float 14 is held in place with a Curie temperature magnet 50 as an alternate to the holding material 16. The float 14 can have an iron or other magnetic film 52 attached to it to interact with the Curie magnet 50. FIG. 6 shows the indicator device 10 before heating or before having reached the critical temperature.

FIG. 7 shows a cross section of the device of FIG. 6 after the release of the float 14 after the critical temperature has been reached, namely to a temperature exceeding the Curie temperature. When the Curie temperature is exceeded, the Curie magnet 50 loses its magnetic attraction such that the float 14 is no longer restrained and floats to the top and is visible through the protruding portion 28. After use, this embodiment can be cooled, inverted such that the float 14 floats upwards to the Curie magnet 50, and is reset for another use.

Referring now to FIGS. 8 and 9, a fifth embodiment of the indicator device 10 is shown. FIG. 8 shows a cross section of a fifth embodiment of the present invention having a reversible critical temperature indicator using bimetallic or nitinol memory material 60 as an alternate to the holding material 16. FIG. 8 illustrates the indicator device 10 before heating or before the critical temperature is reached. FIG. 8 illustrates a transparent tubular structure 12 filled with a transparent fluid 18 such as canola oil. A float 14 is held in place by the bimetallic element or a nitinol memory material 60. As can be seen, float 14 has an indentation 62 into which the bimetallic element or nitinol memory material 60 fits at a temperature below the critical temperature.

FIG. 9 shows a cross section of the device of FIG. 8 after the critical temperature has been reached. When the critical temperature is reached, the restraining material 60 will move out of the indentation 62 and release the float 14. As in other embodiments, float 14 then rises up through the fluid 14 to the protruding portion 28 where it is visible, indicating to the user that the critical temperature has been reached, and in the food cooking example, the roast beef is for example medium rare.

This embodiment of the indicator device 10 also can be reset. To reset the indicator device 10, it is turned upside down and the force of the wedge-shaped end 64 of the float 14 will force the restraining material 60 to the wall 20 until the indentation 62 in the float 14 allows the restraining material 60 back to lock the float 14 in place. This is just one illustrative example of such an assembly. Other configurations using small thermistors also are suitable. The general concept is to have sufficient motion at some critical temperature so the restraining material 60 will release the float 15.

Figure 10:
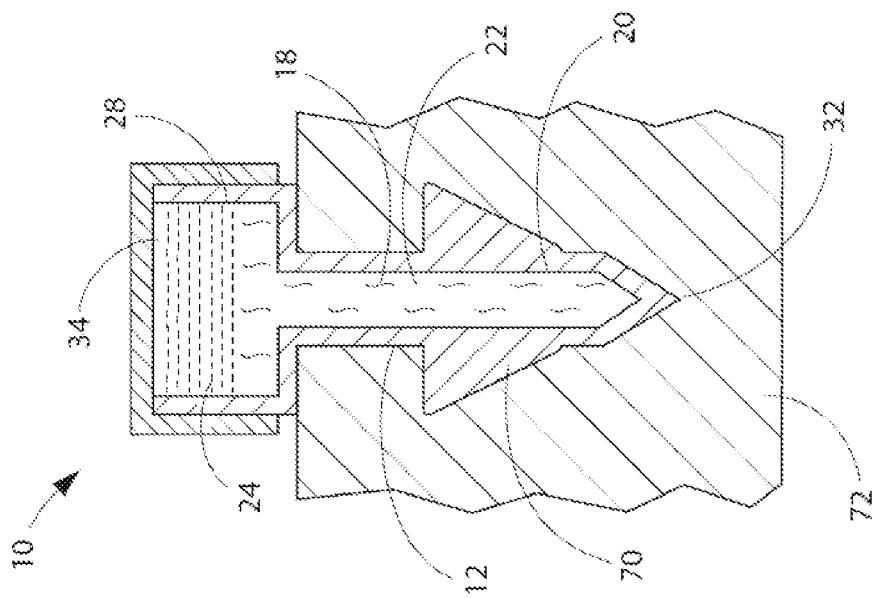
FIG. 10 shows a cross section of a sixth embodiment of the device of the present invention for use in determining whether an animal may have a fever prior to the device having been subjected to a critical temperature.
Figure 11:
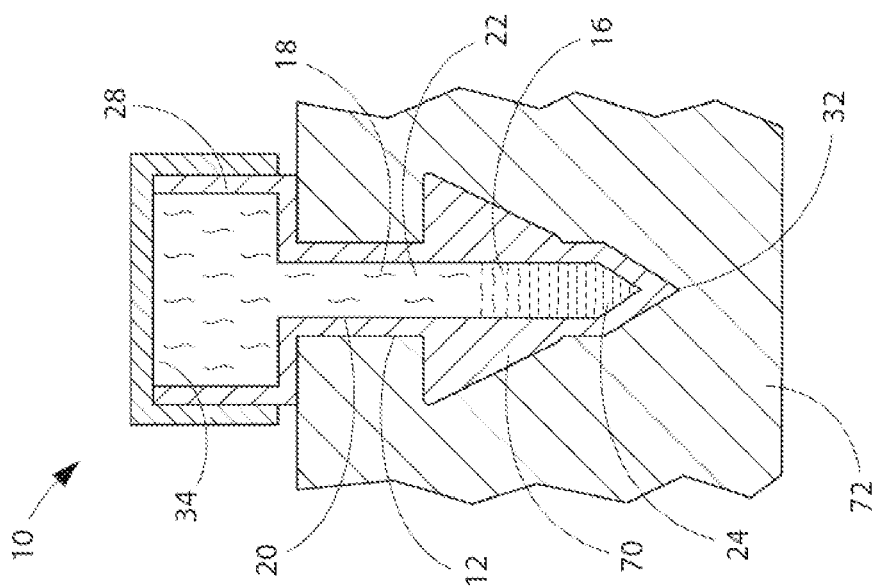
FIG. 11 shows a cross section of the device of FIG. 10 after the device has been subjected to a critical temperature.

Referring now to FIGS. 10 and 11, a sixth embodiment of the indicator device 10 is shown, this embodiment being a fever indicator. FIG. 10 shows a cross section of this sixth embodiment of the device with an indicator inserted into an animal's skin before the animal has a fever, that is, before the critical temperature has been reached, the critical temperature in this case being a fever temperature.

FIG. 10 illustrates an embodiment comprising a thin pin-like tubular structure 12 having barbs 70 that can be inserted in the skin 72 of cattle or other animals. When the animal has a fever, the pigmented floating particles 24 that are held in place by the holding material 16 are released and will float through and up the fluid 18 in the tubular structure 12. The thin pin-like tubular structure 12 preferably comprises a 0.03-0.10 inch diameter needle for easy penetration with a large surface area to see the color change from a distance.

FIG. 11 shows a cross section of the device of FIG. 10 after the release of floating pigmented material 24 when the animal has a fever, namely, after the critical temperature has been reached.

An indicator device 10 for cattle or herds of animals where a small device can be inserted in the skin 70 of the animal that can change color to show if the animal has a fever from some infection could allow the animal to be removed from the herd and prevent infecting the other animals. These devices should be reliable and inexpensive.

The above detailed description of the embodiments, and the examples, are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention

The invention claimed is:

1. A temperature indicator comprising:
   a) a hollow tubular structure having an outer wall interposed between a first end and a second end, the outer wall defining a hollow interior having an inside wall;
   b) a float releasably held in place at a point on the inside wall of the tubular structure at or near the first end by a temperature dependent holding material that melts at or about a critical temperature, the temperature dependent holding material interposed between the first end and the second end, the float having a first density, wherein the temperature dependent holding material is a coating on the float that attaches the float to the inside wall of the tubular structure; and
   c) a fluid within the hollow interior, the fluid interposed between the second end and the float, the fluid having a second density that is greater than the first density, the fluid being a material different than the temperature dependent holding material,
   wherein when the temperature indicator is heated to or about to the critical temperature, the temperature dependent holding material melts and releases the float from the inside wall, whereby the float floats through the fluid towards the second end, and
   wherein the float is visible at or near the second end as an indicator that the critical temperature has been reached.

2. The temperature indicator as claimed in claim 1, wherein the fluid has a low freezing point and a boiling point of at least 200° F. and is non-toxic to humans.

3. The temperature indicator as claimed in claim 1, wherein the fluid, the float and the temperature dependent holding material are in a closed encapsulated assembly.

4. The temperature indicator as claimed in claim 1, wherein the temperature dependent holding material is configured as a layer having a thickness of between 0.008 inches and 0.010 inches that is interposed between the first end and the second end of the tubular structure so as to attach the float on the inside wall of the of the tubular structure at a point between the first end and the second end of the tubular structure.

5. The temperature indicator as claimed in claim 1, wherein the temperature indicator is constructed at least in part of transparent materials.

6. The temperature indicator as claimed in claim 1, wherein the first end is inserted into a mass for which the temperature is to be indicated and the second end is visible outside of the mass, and wherein the second end is constructed at least in part of a material through which the float is viewed.

7. The temperature indicator as claimed in claim 5, wherein the transparent material has a melting point of at least 350° F.

8. The temperature indicator as claimed in claim 1, wherein the float is a material that withstands elevated temperatures of at least 200° F. and is food grade.

9. The temperature indicator as claimed in claim 1, further comprising an end cap that is threaded or heat sealed onto the hollow tubular structure to provide a leak proof unit.

10. A temperature indicator comprising:
    a) a hollow tubular structure having an outer wall and a hollow interior and containing a Curie temperature magnet material;
    b) a float comprising an iron or magnetic film coating releasably held in place in the hollow interior of the tubular structure by the Curie temperature magnet material, the float having a first density; and
    c) a fluid within the hollow interior of the tubular structure, the fluid having a second density that is greater than the first density,
    wherein when the temperature indicator is heated to or about to a critical temperature, the Curie temperature magnet material becomes non-magnetic at or about the critical temperature and releases the float in the fluid so as to be visible as an indicator that the critical temperature has been reached.

11. The temperature indicator as claimed in claim 10, wherein the temperature indicator may be reset and reused when turned upside down or inverted after it has cooled.

* * * * *